United States Patent
Pan et al.

(10) Patent No.: US 7,548,577 B2
(45) Date of Patent: Jun. 16, 2009

(54) FREQUENCY DOMAIN JOINT DETECTION FOR WIRELESS COMMUNICATION SYSTEMS

(75) Inventors: Jung-Lin Pan, Selden, PA (US); Yingming Tsai, Boonton, NJ (US); Guodong Zhang, Farmingdale, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 287 days.

(21) Appl. No.: 11/441,881

(22) Filed: May 26, 2006

(65) Prior Publication Data

US 2006/0274842 A1 Dec. 7, 2006

Related U.S. Application Data

(60) Provisional application No. 60/687,834, filed on Jun. 6, 2005.

(51) Int. Cl.
*H04B 1/00* (2006.01)
(52) U.S. Cl. ........................ 375/130; 375/147; 375/316; 375/340; 375/136
(58) Field of Classification Search ................. 375/130, 375/136, 147, 316, 340
See application file for complete search history.

(56) References Cited

U.S. PATENT DOCUMENTS

| | | | |
|---|---|---|---|
| 6,219,341 B1 * | 4/2001 | Varanasi | 370/252 |
| 6,961,395 B2 * | 11/2005 | Fuller et al. | 375/350 |
| 7,133,646 B1 * | 11/2006 | Miao | 455/73 |
| 2002/0048333 A1 | 4/2002 | Ahmed et al. | |
| 2003/0185179 A1 * | 10/2003 | Inogai et al. | 370/335 |
| 2004/0062317 A1 | 4/2004 | Uesugi et al. | |
| 2004/0120274 A1 * | 6/2004 | Petre et al. | 370/320 |
| 2005/0018598 A1 | 1/2005 | Borran et al. | |
| 2006/0245472 A1 | 11/2006 | Pan et al. | |

* cited by examiner

*Primary Examiner*—Ted Wang
(74) *Attorney, Agent, or Firm*—Volpe and Koenig PC

(57) ABSTRACT

A method and apparatus for frequency domain joint detection for multicarrier code division multiple access (MC-CDMA) and spread orthogonal frequency division multiple access (OFDMA) systems are disclosed. The apparatus includes a receiver having a frequency domain joint detector, whereby channel distortion and data symbols are jointly equalized and detected by the frequency domain joint detector in a frequency domain. Users of the data symbols may be assigned all or a subset of subcarriers with variable spreading factor codes. Alternatively, the subset of subcarriers may be further divided into multiple partitions and the frequency domain joint detection may be performed on the subcarriers in the partition. The users are assigned a spreading code, which may be a Hadamard code, a spread complex quadratic sequence (SCQS) code or any type of orthogonal spreading code.

21 Claims, 1 Drawing Sheet

FREQUENCY DOMAIN JOINT DETECTION FOR WIRELESS COMMUNICATION SYSTEMS

CROSS REFERENCE TO RELATED APPLICATION

This application claims the benefit of U.S. provisional application No. 60/687,834 filed Jun. 6, 2005, which is incorporated by reference as if fully set forth.

FIELD OF INVENTION

The present invention relates to wireless communication systems. More particularly, the present invention is related to frequency domain joint detection for wireless communication systems, such as multicarrier code division multiple access (MC-CDMA) systems and spread orthogonal frequency division multiple access (OFDMA) systems.

BACKGROUND

MC-CDMA systems and spread OFDMA systems are candidate systems for third generation partnership project (3GPP) long term evolution that can support a very high data rate for both downlink and uplink transmissions.

MC-CDMA systems are direct spreading code division multiple access (DS-CDMA) systems wherein the spreading is performed in a frequency domain. At the transmitter, N data symbols of each user generated in each OFDM symbol duration are spread into NM chips using a length-M spreading code and mapped to multiple subcarriers. The chips from different users are then added together and the resulting chips are fed to an inverse Fourier transform processor of an OFDM transmitter. The data symbols of each user can be recovered by despreading the output of a Fourier transform processor in a receiver.

OFDMA is an alternative multiple access scheme for OFDM systems, where the signals of different users are separated in the frequency domain by allocating different subcarriers to different users.

When MC-CDMA or spread OFDMA is used for downlink transmissions, one tap equalizer with despreading across subcarriers may be sufficient for data detection when used subcarriers have the same or very similar channel responses because all the users have the same propagation channel and spreading codes are orthogonal across different subcarriers. However, the subcarriers often have different channel responses, which destroys the orthogonality of codes in the despreading processes, and one-tap matched filter or equalizer may not be sufficient for data detection. When MC-CDMA or spread OFDMA is used for uplink transmissions, one tap equalizer suffers significant performance degradation because users have distinct propagation channels in the uplink and each user experiences different delay spread and fading channel and, therefore, the orthogonality between spreading codes is destroyed.

SUMMARY

The present invention provides a method and apparatus for frequency domain joint detection. A receiver considers a distinct delay spread and fading channels for all users and jointly equalizes the channel distortions and detects the data symbols of all users in the frequency domain. The users may be assigned all or a subset of subcarriers with variable spreading factor codes. Alternatively, the subset of subcarriers may be further divided into multiple partitions and the frequency domain joint detection may be performed on the subcarriers in the partition. The users are assigned a spreading code, which may be a Hadamard code, a spread complex quadratic sequence (SCQS) code, generalized chirp-like (GCL) sequences, Newman phase code, polyphase code, or any type of orthogonal or good correlation spreading code. By using the frequency domain joint detection method of the present invention for MC-CDMA or spread OFDMA systems in the uplink or downlink, the performance of data detection is improved when compared to conventional systems.

DETAILED DESCRIPTION OF THE PREFERRED EMBODIMENTS

The features of the present invention may be incorporated into an integrated circuit (IC) or be configured in a circuit comprising a multitude of interconnecting components.

Figure 1:
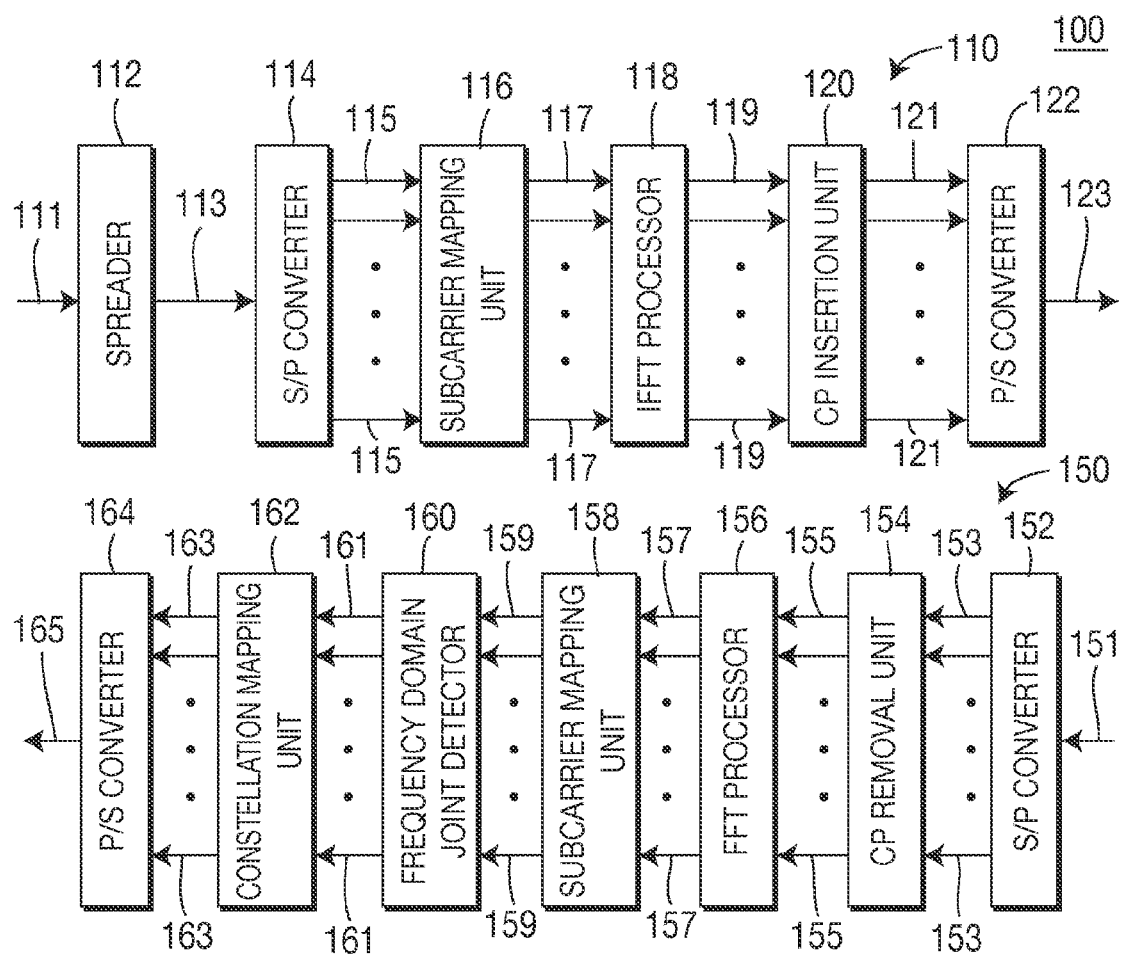
FIG. 1 is a block diagram of a system including a transmitter and a receiver for frequency domain joint detection for MC-CDMA or spread OFDMA in accordance with the present invention.

FIG. 1 is a block diagram of a wireless communication system 100 including a transmitter 110 and a receiver 150 for performing frequency domain joint detection for MC-CDMA or spread OFDMA in accordance with the present invention. The transmitter 110 includes a spreader 112, a serial-to-parallel (S/P) converter 114, a subcarrier mapping unit 116, an inverse fast Fourier transform (IFFT) processor 118, a cyclic prefix (CP) insertion unit 120 and a parallel-to-serial (P/S) converter 122. An input data symbol 111 is spread in the frequency domain and mapped to a plurality of subcarriers. The spreading code may be a Hadamard code, a spread complex quadratic sequence (SCQS) code, a polyphase code, generalized chirp-like (GCL) sequences, Newman phase code or any type of orthogonal or good correlation codes. The details of the SCQS code are disclosed in a co-pending U.S. patent application Ser. No. 11/385,168 entitled "ORTHOGONAL FREQUENCY DIVISION MULTIPLEXING-CODE DIVISION MULTIPLE ACCESS SYSTEM" and is incorporated by reference as if fully set forth.

As shown in FIG. 1, the input data symbol 111 is spread by the spreader 112 to generate a chip sequence 113. The chip sequence 113 is converted to a parallel chip stream 115 by the S/P converter 114. Each of the chips of the parallel chip stream 115 is mapped to one of the subcarriers by the subcarrier mapping unit 116 to generate parallel chip stream 117. The parallel chip stream 117 is fed into the IFFT processor 118 to be converted into time domain data 119. A CP is then added to the time domain data 119 by the CP insertion unit 120 to generate time domain data with CP 121. The time domain data with CP 121 is then converted to a serial data 123 by the P/S converter 122 for transmission. It should be noted that the IFFT operation may be replaced by IDFT or other similar operations, and the CP insertion may be performed after the IFFT output is converted into a serial data stream by the P/S converter 122.

Still referring to FIG. 1, the receiver 150 includes an S/P converter 152, a CP removal unit 154, a fast Fourier transform (FFT) processor 156, a subcarrier mapping unit 158, a frequency domain joint detector 160, a constellation mapping unit 162 and a P/S converter 164. Data 151 is received and converted to a parallel data stream 153 by the S/P converter 152. A CP is removed from the parallel data stream 153 by the CP removal unit 154. The FFT processor 156 converts a parallel data stream 155 output by the CP removal unit 154 to frequency domain data 157. The subcarrier mapping unit 158 then outputs a subcarrier demapped data stream 159 based on the frequency domain data 157 by reverting the subcarrier mapping operation which was performed at the transmitter 110. The frequency domain joint detector 160 performs joint equalization and data detection on the subcarrier demapped data stream 159 to output symbol streams 161, which will be described in detail hereinafter. The symbol streams 161 are then mapped to bit streams 163 by the constellation mapping unit 162. The bit streams 163 are then converted to a serial bit stream 165 by the P/S converter 164.

Frequency domain joint detection in accordance with a first embodiment of the present invention is described hereinafter. It is assumed that there are N subcarriers in the system, (i.e., a MC-CDMA or spread OFDMA system). The signal model after the FFT operation at the receiver 150 is expressed as follows:

$$\begin{bmatrix} r_1 \\ r_2 \\ r_3 \\ \vdots \\ r_N \end{bmatrix} = \begin{bmatrix} c_1^{(1)}H_1^{(1)} & c_1^{(2)}H_1^{(2)} & c_1^{(3)}H_1^{(3)} & \cdots & c_1^{(N)}H_1^{(N)} \\ c_2^{(1)}H_2^{(1)} & c_2^{(2)}H_2^{(2)} & c_2^{(3)}H_2^{(3)} & & \\ c_3^{(1)}H_3^{(1)} & c_3^{(2)}H_3^{(2)} & c_3^{(3)}H_3^{(3)} & & \\ \vdots & & & \ddots & \\ c_N^{(1)}H_N^{(1)} & c_N^{(2)}H_N^{(2)} & c_N^{(3)}H_N^{(3)} & & c_N^{(N)}H_N^{(N)} \end{bmatrix} \begin{bmatrix} d^{(1)} \\ d^{(2)} \\ d^{(3)} \\ \vdots \\ d^{(N)} \end{bmatrix} +$$

$$\begin{bmatrix} n_1 \\ n_2 \\ n_3 \\ \vdots \\ n_N \end{bmatrix},$$

Equation (1)

where $r_n$, n=1, 2, . . . , N is the received data in the frequency domain, (i.e., the output of the FFT processor 156 of the receiver 150), for the nth subcarrier. $c_n^{(k)}$, k=1, 2, . . . , N is an nth element of the spreading code k. $H_n^{(k)}$ is a flat fading coefficient of the spreading code k in frequency domain for the subcarrier n. $d^{(k)}$ is the transmitted data symbol carried by the spreading code k. Without loss of generality, it is assumed that the data are spread using spreading codes across subcarriers 1 to N. It should be noted that a spreading factor other than N may be used.

Users may use one or several spreading codes for transmissions. Without loss of generality, it is assumed that each user uses only one spreading code and that there are a total of K users in the system. The signal model and detection algorithm can be easily extended to multi-code transmission where one user transmits multiple codes. Equation (1) is generalized to K users and N subcarriers as follows:

$$\begin{bmatrix} r_1 \\ r_2 \\ r_3 \\ \vdots \\ r_N \end{bmatrix} = \begin{bmatrix} c_1^{(1)}H_1^{(1)} & c_1^{(2)}H_1^{(2)} & c_1^{(3)}H_1^{(3)} & \cdots & c_1^{(K)}H_1^{(K)} \\ c_2^{(1)}H_2^{(1)} & c_2^{(2)}H_2^{(2)} & c_2^{(3)}H_2^{(3)} & & \\ c_3^{(1)}H_3^{(1)} & c_3^{(2)}H_3^{(2)} & c_3^{(3)}H_3^{(3)} & & \\ \vdots & & & \ddots & \\ c_N^{(1)}H_N^{(1)} & c_N^{(2)}H_N^{(2)} & c_N^{(3)}H_N^{(3)} & & c_N^{(K)}H_N^{(K)} \end{bmatrix} \begin{bmatrix} d^{(1)} \\ d^{(2)} \\ d^{(3)} \\ \vdots \\ d^{(K)} \end{bmatrix} +$$

Equation (2)

-continued $$\begin{bmatrix} n_1 \\ n_2 \\ n_3 \\ \vdots \\ n_N \end{bmatrix},$$

where K is the number of users or codes. K and N should satisfy the condition $K \leq N$.

Equation (2) can be written in a vector-matrix form as follows:

$$\vec{r} = A_f \vec{d} + \vec{n};$$

Equation (3)

where $A_f$ is a frequency domain system matrix with a dimension of N×K.

The frequency domain joint detection-performed by the frequency domain joint detector 160 using minimum mean square error (MMSE) criteria is expressed as follows:

$$\vec{d} = (A_f^H A_f + \sigma^2 I)^{-1} A_f^H \vec{r};$$

Equation (4)

where $\vec{d}$ is the estimated data symbols for all K users, which is output of the frequency domain joint detector 160.

The receiver 150 in FIG. 1 may also be used for a spread OFDMA system. In the spread OFDMA system, each user may use a subset of OFDMA subcarriers. Users use the spreading codes combined with subcarriers for multiple access in spread OFDMA systems. Several users may be assigned to different subsets of subcarriers or may be assigned to the same subset of subcarriers. An extreme case will be only one subset that contains all the OFDMA subcarriers is used for all users. In this case, users can only be distinguished from each other by using different spreading codes.

In accordance with a second embodiment of the present invention, variable spreading factors are used for spreading the input data symbols and the frequency domain joint detection is performed on a subset of subcarriers. The smaller the subset of subcarriers on which the frequency domain joint detection is performed the less complex the detection is. It is assumed that there are K total users in the system and each user is assigned a subset of the subcarriers using OFDMA. It is also assumed that there are M subsets of subcarriers, ($M \leq K$), and the i-th subset contains $N_i$ subcarriers. Users may be assigned to the same subset of subcarriers.

Let $K_1$ users (or codes) share the subcarriers of the first subset and use the spreading factor $Q_1$; $K_2$ users (or codes) share the subcarriers of the second subset and use the spreading factor $Q_2$; $K_i$ users (or codes) share the subcarriers of the i-th subset and use the spreading factor $Q_i$. The sum of the number of users (or codes) in all subsets is equal to the total number of users (or codes) in the system, (i.e., $$K = \sum_{i=1}^{M} K_i \bigg).$$

The received data model for the first subset of subcarriers is expressed as follows:

$$\begin{bmatrix} r_1 \\ r_2 \\ r_3 \\ \vdots \\ r_{Q_1} \end{bmatrix} = \begin{bmatrix} c_1^{(1)}H_1^{(1)} & c_1^{(2)}H_1^{(2)} & c_1^{(3)}H_1^{(3)} & \cdots & c_1^{(K_1)}H_1^{(K_1)} \\ c_2^{(1)}H_2^{(1)} & c_2^{(2)}H_2^{(2)} & c_2^{(3)}H_2^{(3)} & & \\ c_3^{(1)}H_3^{(1)} & c_3^{(2)}H_3^{(2)} & c_3^{(3)}H_3^{(3)} & & \\ \vdots & & & \ddots & \\ c_{Q_1}^{(1)}H_{Q_1}^{(1)} & c_{Q_1}^{(2)}H_{Q_1}^{(2)} & c_{Q_1}^{(3)}H_{Q_1}^{(3)} & & c_{Q_1}^{(K_1)}H_{Q_1}^{(K_1)} \end{bmatrix} \begin{bmatrix} d^{(1)} \\ d^{(2)} \\ d^{(3)} \\ \vdots \\ d^{(K_1)} \end{bmatrix} + \begin{bmatrix} n_1 \\ n_2 \\ n_3 \\ \vdots \\ n_{Q_1} \end{bmatrix}.$$

Equation (5)

In general, for the i-th subset of subcarriers, the received signal model can be written as follows:

$$\begin{bmatrix} r_1 \\ r_2 \\ r_3 \\ \vdots \\ r_{Q_i} \end{bmatrix} = \begin{bmatrix} c_1^{(1)}H_1^{(1)} & c_1^{(2)}H_1^{(2)} & c_1^{(3)}H_1^{(3)} & \cdots & c_1^{(K_i)}H_1^{(K_i)} \\ c_2^{(1)}H_2^{(1)} & c_2^{(2)}H_2^{(2)} & c_2^{(3)}H_2^{(3)} & & \\ c_3^{(1)}H_3^{(1)} & c_3^{(2)}H_3^{(2)} & c_3^{(3)}H_3^{(3)} & & \\ \vdots & & & \ddots & \\ c_{Q_i}^{(1)}H_{Q_i}^{(1)} & c_{Q_i}^{(2)}H_{Q_i}^{(2)} & c_{Q_i}^{(3)}H_{Q_i}^{(3)} & & c_{Q_i}^{(K_i)}H_{Q_i}^{(K_i)} \end{bmatrix} \begin{bmatrix} d^{(1)} \\ d^{(2)} \\ d^{(3)} \\ \vdots \\ d^{(K_i)} \end{bmatrix} +$$

Equation (6)

$$\begin{bmatrix} n_1 \\ n_2 \\ n_3 \\ \vdots \\ n_{Q_i} \end{bmatrix}.$$

The spreading factor $Q_i$ is equal to the number of subcarriers in the i-th subset, (i.e., $Q_i = N_i$). The overall received signal model can be expressed as follows:

$$\vec{r}^i = A_f^i \vec{d}^i + \vec{n}^i, i=1,2,\ldots,M.$$

Equation (7)

Where $\vec{r}^i$ is the frequency domain received signal after the FFT processing for the i-th subset of subcarriers. $A_f^i$ and $\vec{d}^i$ are the frequency domain system matrix and data vector for the i-th subset of subcarriers. The system matrix $A_f^i$ has a dimension of $Q_i \times K_i$. The MMSE frequency domain joint detection performed by the frequency domain joint detector 160 is expressed as follows:

$$\vec{\hat{d}}^i = (A_f^{iH} A_f^i + \sigma^2 I)^{-1} A_f^{iH} \vec{r}^i, i=1,2,\ldots,D;$$

Equation (8)

where $\vec{\hat{d}}^i$ is the estimated data symbol of the transmitted data symbol $\vec{d}^i$ for the user i. The correlation matrix $A_f^{iH} A_f^i$ is a square matrix with a size of $K_i$.

In accordance with a third embodiment of the present invention, subcarriers are partitioned and frequency domain joint detection is performed on the subcarriers in the partition for further reduction in complexity. It is assumed that there are M subsets of subcarriers and $D^i$ partitions in the i-th subset of subcarriers. There are a total of D partitions, $$\left(i.e., D = \sum_{i=1}^{M} D^i\right).$$

It is also assumed that there are $N_i$ subcarriers for the i-th subset. Let $K_i$ users use the $D^{i,j}$ partitions and use the spreading factor $Q_{i,j}$.

The received signal model for the j-th partition of the i-th subset of subcarriers is written as follows:

$$\begin{bmatrix} r_1 \\ r_2 \\ r_3 \\ \vdots \\ r_{Q_i} \end{bmatrix} = \begin{bmatrix} c_1^{(1)}H_1^{(1)} & c_1^{(2)}H_1^{(2)} & c_1^{(3)}H_1^{(3)} & \cdots & c_1^{(K_i)}H_1^{(K_i)} \\ c_2^{(1)}H_2^{(1)} & c_2^{(2)}H_2^{(2)} & c_2^{(3)}H_2^{(3)} & & \\ c_3^{(1)}H_3^{(1)} & c_3^{(2)}H_3^{(2)} & c_3^{(3)}H_3^{(3)} & & \\ \vdots & & & \ddots & \\ c_{Q^{(i,j)}}^{(1)}H_{Q^{(i,j)}}^{(1)} & c_{Q^{(i,j)}}^{(2)}H_{Q^{(i,j)}}^{(2)} & c_{Q^{(i,j)}}^{(3)}H_{Q^{(i,j)}}^{(3)} & & c_{Q^{(i,j)}}^{(K_i)}H_{Q^{(i,j)}}^{(K_i)} \end{bmatrix} \begin{bmatrix} d^{(1)} \\ d^{(2)} \\ d^{(3)} \\ \vdots \\ d^{(K_i)} \end{bmatrix} +$$

Equation (9)

$$\begin{bmatrix} n_1 \\ n_2 \\ n_3 \\ \vdots \\ n_{Q^{(i,j)}} \end{bmatrix}.$$

$$N_i = \sum_{j=1}^{D^i} Q^{i,j}$$

for the i-th subset. The overall received signal model for the i-th subset and the j-th partition is expressed as follows:

$$\vec{r}^{i,j} = A_f^{i,j} \vec{d}^{i,j} + \vec{n}^{i,j}, i=1,2,\ldots,M, j=1,2,\ldots,D^i; \quad \text{Equation (10)}$$

where $\vec{r}^{i,j}$ is the received frequency domain signal for the i-th subset and the j-th partition of subcarriers. $A_f^{i,j}$ and $\vec{d}^{i,j}$ are the frequency domain system matrix and data vector for the i-th subset and j-th partition of subcarriers. The system matrix $A_f^{i,j}$ has a dimension of $Q^{i,j} \times K_i$. The MMSE frequency domain joint detection performed by the frequency domain joint detector 160 is expressed as follows:

$$\hat{\vec{d}}^{i,j} = (A_f^{i,j H} A_f^{i,j} + \sigma^2 I)^{-1} A_f^{i,j H} \vec{r}^{i,j}, i=1,2,\ldots,M, j=1,2,\ldots,D^i; \quad \text{Equation (11)}$$

where $\hat{\vec{d}}^{i,j}$ is the estimated data symbol of the transmitted data symbol $\vec{d}^{i,j}$ for the i-th subset and j-th partition of subcarriers. The correlation matrix $A_f^{i,j H} A_f^{i,j}$ is a square matrix with the size of $K_i$.

In accordance with a fourth embodiment of the present invention, variable spreading factors are used for users (or codes). Suppose that there are $K_i$ codes in subcarrier subset i and each code is transmitted with a spreading factor $Q_{i,k}$ for the k-th code in subset i. Let $Q_{max}$ be the maximum spreading factor among spreading factors of all codes in subset i, such that $Q_{max} = \max\{Q_{i,1}, Q_{i,2}, \ldots, Q_{i,K_i}\}$, and spreading factors for codes are in descending order such that $Q_{max} = Q_{i,1} \geq Q_{i,2} \geq \ldots \geq Q^{i,K_i}$. Denote $A_f^{(i,k)}$ as a transmission matrix of the k-th code in subset i. The transmission matrix of each individual code is concatenated to form a system transmission matrix of the entire codes in the system and the relationship can be expressed as:

$$A_f^i = [A_f^{(i,1)} A^{(i,2)} \ldots A_f^{(i,k)} \ldots A_f^{(i,K_i)}]. \quad \text{Equation (12)}$$

Each transmission matrix $A_f^{(i,k)}$ consists of $Q_{max}$ rows and $Q_{max}/Q_{i,k}$ columns. The matrix $A_f^{(i,k)}$ is a vector diagonal matrix and can be expressed as:

$$A_f^{(i,k)} = \begin{bmatrix} \vec{v}^{(k,1)} & & & \\ & \vec{v}^{(k,2)} & & \\ & & \ddots & \\ & & & \vec{v}^{\left(k,\frac{Q_{max}}{Q_{i,k}}\right)} \end{bmatrix}; \quad \text{Equation (13)}$$

where $$\vec{v}^{(k,1)}, j = 1, 2, \ldots, \frac{Q_{max}}{Q_{i,k}}$$

is a column vector which serves as the base or non-zero elements for the j-th column in matrix $A_f^{(i,k)}$ containing the code elements and the corresponding channel responses. The p-th element of $\vec{v}^{(k,j)}$ is:

$$\vec{v}^{(k,j)}(p) = c_p^{(k)} H_{p+(j-1)Q_{i,k}}^{(k)}; \quad \text{Equation (14)}$$

where $H_p^{(k)}$ is the frequency domain channel response of the p-th subcarrier of the k-th code. The detected signal vector $\hat{\vec{d}}$ contains the data symbols of all the codes in a concatenated form such that:

$$\hat{\vec{d}}^i = \begin{bmatrix} \hat{\vec{d}}^{(i,1)} & \hat{\vec{d}}^{(i,2)} & \ldots & \hat{\vec{d}}^{(i,k)} & \ldots & \hat{\vec{d}}^{(i,K_i)} \end{bmatrix}^T; \quad \text{Equation (15)}$$

where $\hat{\vec{d}}^{(i,k)}$ are the data symbols carried on the k-th code in subset i and have the variable data length of $$\frac{Q_{max}}{Q_{i,k}}$$

depending on the spreading factor $Q_{i,k}$. $\hat{\vec{d}}^{(i,k)}$ can be represented as:

$$\hat{\vec{d}}^{(i,k)} = \begin{bmatrix} \hat{d}_1^{(i,k)} & \hat{d}_2^{(i,k)} & \ldots & \hat{d}_{\frac{Q_{max}}{Q_{i,k}}}^{(i,k)} \end{bmatrix}. \quad \text{Equation (17)}$$

Figure 2:
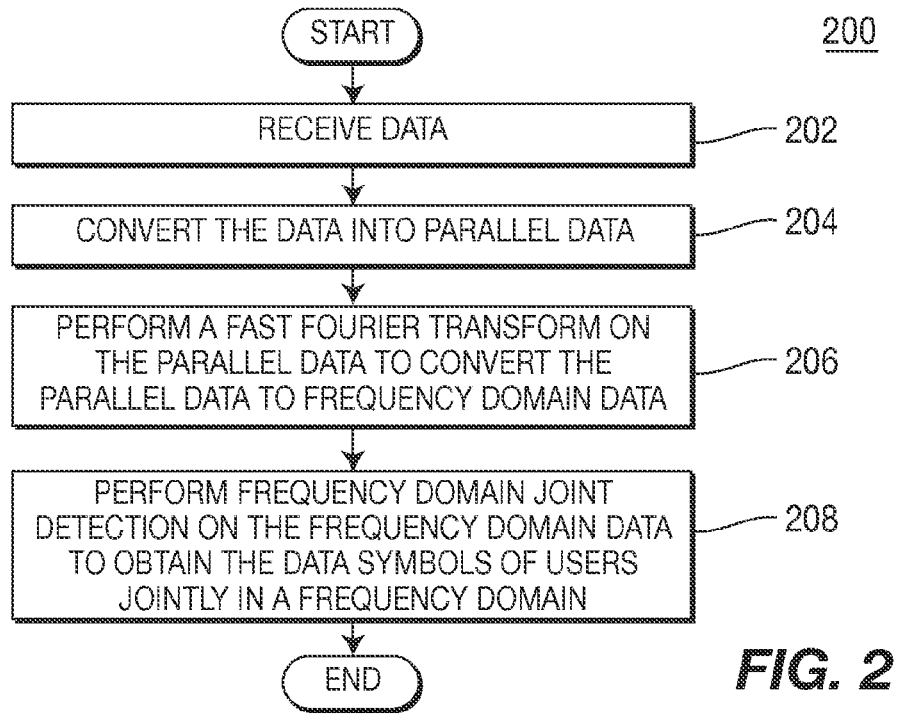
FIG. 2 is a flow diagram of a process for frequency domain joint detection for MC-CDMA or spread OFDMA in accordance with the present invention.

FIG. 2 is a flow diagram of a process 200 for frequency domain joint detection for MC-CDMA or spread OFDMA in accordance with the present invention. A plurality of orthogonal subcarriers are assigned to users to carry data symbols of the users. A receiver receives data (step 202) and converts the received data into parallel data (step 204). An inverse Fourier transform is performed on the parallel data to convert the parallel data to frequency domain data (step 206). Frequency domain joint detection is then performed on the frequency domain data to obtain the data symbols of users jointly in a frequency domain (step 208).

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for joint detection of data symbols in a frequency domain, the method comprising:
    receiving data;
    converting the data into parallel data by a serial-to-parallel converter;
    performing a fast Fourier transform on the parallel data to convert the parallel data to frequency domain data by a fast Fourier transform processor; and
    performing frequency domain joint detection on the frequency domain data to obtain the data symbols of users jointly in a frequency domain, wherein users are assigned a plurality of subcarriers and a spreading code with a spreading factor equal to the number of subcarriers so that user data is spread with the spreading code and mapped to the subcarriers, and the frequency domain joint detection is performed on the subcarriers.

2. The method of claim 1 wherein users are assigned a spreading code with a spreading factor equal to a total number of subcarriers in a subset, and the frequency domain joint detection is performed on the subcarriers.

3. The method of claim 2 wherein users are assigned spreading codes with variable spreading factors.

4. The method of claim 1 wherein users are assigned a subset of subcarriers and the frequency domain joint detection is performed on the subset of subcarriers.

5. The method of claim 4 wherein users are assigned spreading codes with variable spreading factors.

6. The method of claim 1 wherein available subcarriers are divided into multiple subsets of subcarriers, each subset of subcarriers is further divided into multiple partitions, each user is assigned subcarriers in a partition, and the frequency domain joint detection is performed on the subcarriers in the partition.

7. The method of claim 1 wherein the spreading code is at least one of a Hadamard code, a spread complex quadratic sequence (SCQS) code, generalized chirp-like (GCL) sequences, Newman phase code and a polyphase code.

8. The method of claim 1 wherein the frequency domain joint detection is performed based on minimum mean square error (MMSE) criteria.

9. The method of claim 1 wherein the data is received using multicarrier code division multiple access (MC-CDMA).

10. The method of claim 1 wherein the data is received using spread orthogonal frequency division multiple access (OFDMA).

11. A receiver configured to perform joint detection of data symbols in a frequency domain, the receiver comprising:
a serial-to-parallel (S/P) converter for converting received data into parallel data;
a fast Fourier transform processor for performing a fast Fourier transform on the parallel data to convert the parallel data to frequency domain data; and
a frequency domain joint detector for performing frequency domain joint detection on the frequency domain data to obtain the data symbols of users jointly in a frequency domain, wherein users are assigned a plurality of subcarriers and a spreading code with a spreading factor equal to the number of subcarriers so that user data is spread with the spreading code and mapped to the subcarriers, and the frequency domain joint detection is performed on the subcarriers.

12. The receiver of claim 11 wherein the users are assigned a spreading code with a spreading factor equal to total number of subcarriers in a subset, and the frequency domain joint detector performs the frequency domain joint detection on the subcarriers.

13. The receiver of claim 12 wherein the users are assigned spreading codes with variable spreading factors.

14. The receiver of claim 11 wherein the users are assigned a subset of subcarriers and the frequency domain joint detector performs the frequency domain joint detection on the subset of subcarriers.

15. The receiver of claim 14 wherein the users are assigned spreading codes with variable spreading factors.

16. The receiver of claim 11 wherein available subcarriers are divided into multiple subsets of subcarriers, each subset of subcarriers is further divided into multiple partitions, each of the users is assigned subcarriers in a partition, and the frequency domain joint detector performs the frequency domain joint detection on the subcarriers in the partition.

17. The receiver of claim 11 wherein the spreading code is at least one of a Hadamard code, a spread complex quadratic sequence (SCQS) code, generalized chirp-like (GCL) sequences, Newman phase code and a polyphase code.

18. The receiver of claim 11 wherein the frequency domain joint detector performs the frequency domain joint detection based on minimum mean square error (MMSE) criteria.

19. The receiver of claim 11 wherein the receiver is a multicarrier code division multiple access (MC-CDMA) receiver.

20. The receiver of claim 11 wherein the receiver is a spread orthogonal frequency division multiple access (OFDMA) receiver.

21. An integrated circuit (IC) configured to perform joint detection of data symbols in a frequency domain, the IC comprising:
a serial-to-parallel (S/P) converter for converting received data into parallel data;
a fast Fourier transform processor for performing a fast Fourier transform on the parallel data to convert the parallel data to frequency domain data; and
a frequency domain joint detector for performing frequency domain joint detection on the frequency domain data to obtain the data symbols of users jointly in a frequency domain, wherein users are assigned a spreading code with a spreading factor equal to a preconfigured number of subcarriers so that user data is spread with the spreading code and mapped to the subcarriers, and the frequency domain joint detection is performed on the subcarriers.

* * * * *